(12) United States Patent
Forey et al.

(10) Patent No.: US 10,284,394 B1
(45) Date of Patent: May 7, 2019

(54) INPUT TERMINATION CIRCUITS FOR HIGH SPEED RECEIVERS

(71) Applicant: INPHI CORPORATION, Santa Clara, CA (US)

(72) Inventors: Simon Forey, Northamptonshire (GB); Rajasekhar Nagulapalli, Northampton (GB); Parmanand Mishra, Cupertino, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 16/101,286

(22) Filed: Aug. 10, 2018

(51) Int. Cl.
*H03K 19/00* (2006.01)
*H04L 25/02* (2006.01)
*H04L 25/03* (2006.01)
*H04B 1/18* (2006.01)
*H04L 1/20* (2006.01)

(52) U.S. Cl.
CPC ...... *H04L 25/0278* (2013.01); *H04L 25/0292* (2013.01); *H04L 25/03878* (2013.01); *H04B 1/18* (2013.01); *H04L 1/20* (2013.01)

(58) Field of Classification Search
CPC .......... H04L 25/0278; H04L 25/03878; H04L 25/0292; H04L 1/20; H04B 1/18
See application file for complete search history.

(56) References Cited

U.S. PATENT DOCUMENTS

| | | | | |
|---|---|---|---|---|
| 2004/0251983 | A1* | 12/2004 | Hsu ......................... | H03H 7/38 333/32 |
| 2009/0088115 | A1* | 4/2009 | Safarian ................... | H04B 1/18 455/296 |
| 2017/0302254 | A1* | 10/2017 | McNamara .............. | H03H 7/06 |
| 2018/0337659 | A1* | 11/2018 | Mu .......................... | H03H 7/25 |

* cited by examiner

*Primary Examiner* — Seokjin Kim
(74) *Attorney, Agent, or Firm* — Richard T. Ogawa; Ogawa P.C.

(57) ABSTRACT

The present invention is directed to communication systems and electrical circuits. According to an embodiment, an input termination circuit includes a first attenuation resistor and a second attenuation resistor. The resistance values of these two resistors are adjusted in opposite directions to maintain a stable output impedance. There are other embodiments as well.

11 Claims, 9 Drawing Sheets

INPUT TERMINATION CIRCUITS FOR HIGH SPEED RECEIVERS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to communication systems and electrical circuits.

Over the last few decades, the use of communication networks exploded. In the early days of the Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily.

In high speed communication applications, an important aspect is to process received signals at the receivers. Among other components, input terminals of receivers are specifically configured to receive and process incoming signals. Over the past, various types of conventional input termination circuits have been used, but unfortunately they have been inadequate. Therefore, improved systems and methods thereof are desired.

BRIEF SUMMARY OF THE INVENTION

The present invention is directed to communication systems and electrical circuits. According to an embodiment, an input termination circuit includes a first attenuation resistor and a second attenuation resistor. The resistance values of these two resistors are adjusted in opposite directions to maintain a stable output impedance and bandwidth. There are other embodiments as well.

According to an embodiment, the present invention provides an input termination circuit. The circuit includes an input terminal configured to receive analog signal. The circuit also includes a first inductor connected to the input terminal. The first inductor is associated with an input bandwidth. The circuit also has a first input resistor coupled to the first inductor. The circuit additionally includes a second input resistor coupled to the first input resistor and the first inductor. The second input resistor is adjustable by a first control signal. The circuit also has a second inductor coupled to the first input resistor. The circuit additionally includes a first attenuation resistor connected to the first input resistor and the second inductor. The first attenuation resistor is adjustable by a digital control signal. The circuit also has an output inductor coupled to the second inductor. The output inductor is associated with an output bandwidth. The circuit has a second attenuation resistor coupled to the second inductor and the output inductor. The second attenuation resistor is adjustable by a third control signal. The circuit has an output terminal coupled to the output inductor. The first attenuation resistor and the second attenuation resistor are adjustable in opposite directions to modify an attenuation amount associated with the input termination circuit.

According to another embodiment, the present invention provides a receiver apparatus. The apparatus includes an input terminal configured to receive analog data. The apparatus also includes an input termination circuit, the input termination circuit comprising. The circuit includes a first inductor coupled to the input terminal. The circuit also includes a first input resistor coupled to the first inductor. The circuit additionally includes a second input resistor coupled to the first input resistor and the first inductor. The circuit also includes a second inductor coupled to the first input resistor. The circuit has a first attenuation resistor connected to the first input resistor and the second inductor. The first attenuation resistor is adjustable by a first control signal. The circuit has an output inductor connected to the second inductor. The output inductor is associated with an output bandwidth. The circuit has a second attenuation resistor coupled to the second inductor and the output inductor. The second attenuation resistor is adjustable by a second control signal. The apparatus has continuous time linear equalizer (CTLE) connected to the output inductor.

According to yet another embodiment, the present invention provides a method of adjusting an input termination circuit. The input termination circuit includes a first attenuation resistor and a second attenuation resistor. The method includes initiating attenuation parameters associated with the input termination circuit. The attenuation parameters include a first resistance value associated with the first attenuation resistor and a second resistance value associated with the second attenuation resistor. The method also includes determining an attenuation setting. The method further includes adjusting the first resistance value based at least on the attenuation setting. The method also includes adjusting the second resistance value based on the first resistance value and the attenuation setting. The method also includes determining a bandwidth associated with the input termination circuit. The method additionally includes adjusting the second resistance value until the bandwidth reaches a desired level. The method further includes receiving data signals using the input termination circuit.

Figure 9:
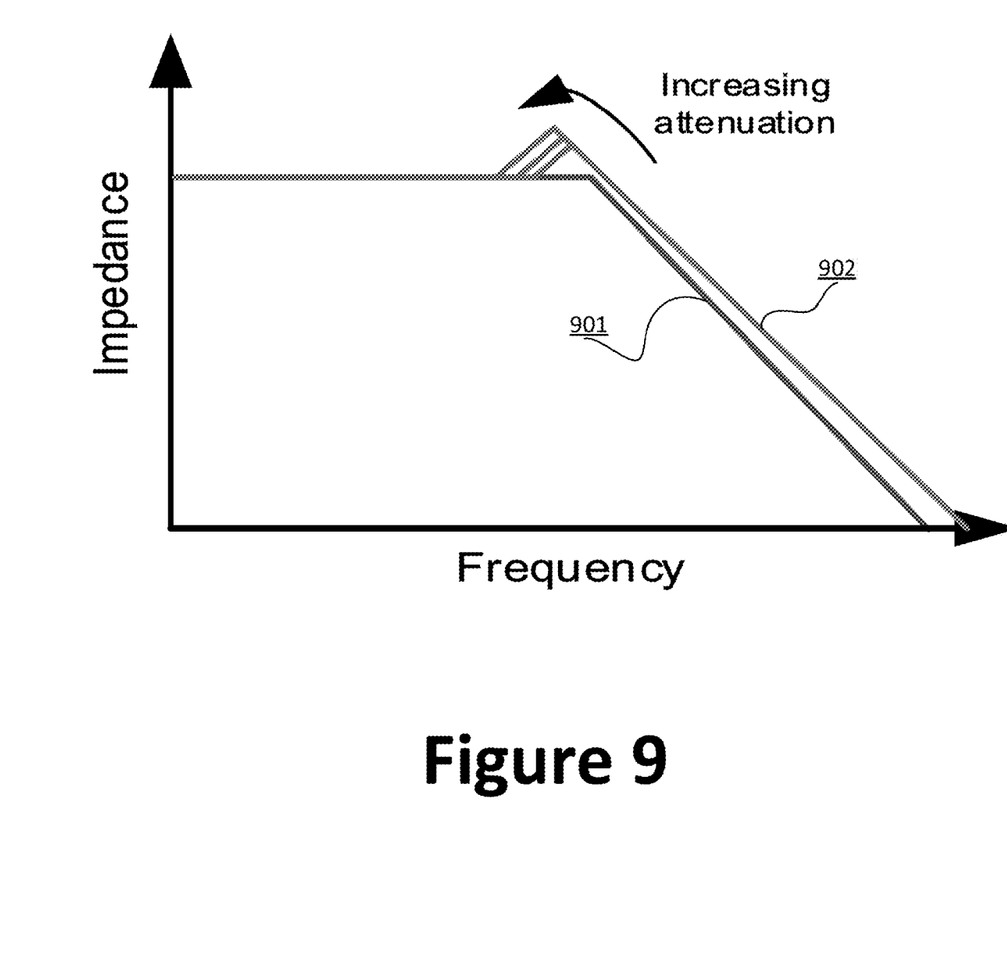
FIG. 9 is a simplified diagram illustrating effect of output inductor according to embodiments of the present invention.

It is to be appreciated that embodiments of the present invention provide many advantages over conventional techniques. Among other things, by stabilizing output impedance of an input termination circuit, bandwidth of the circuit is stabilized and kept substantially constant. For example, stabilized circuit bandwidth is illustrated in FIG. 9, where substantially constant peaking is achieved across different attenuation settings (i.e., translating to substantially constant bandwidth). In comparison, for various conventional input termination circuits, peaking changes at different attenuation settings, thereby resulting in bandwidth degradation. In comparison to conventional designs, input termination circuits according to the present invention improve bandwidth at comparable power budget levels. For example, input termination circuits described herein can be used in SerDes receivers where a high linearity is important. Among other things, high bandwidth for SerDes receivers improves signal to noise ratio (SNR) and Bit Error Rate (BER) of the communication link.

Embodiments of the present invention can be implemented in conjunction with existing systems and processes. For example, input termination circuits according to the present invention can be manufactured using existing manufacturing processes. Additionally, embodiments of the present invention can be utilized in existing receivers. There are other benefits as well.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention is directed to communication systems and electrical circuits. According to an embodiment, an input termination circuit includes a first attenuation resistor and a second attenuation resistor. The resistance values of these two resistors are adjusted in opposite directions to maintain a stable output impedance and bandwidth. There are other embodiments as well.

Figure 1:
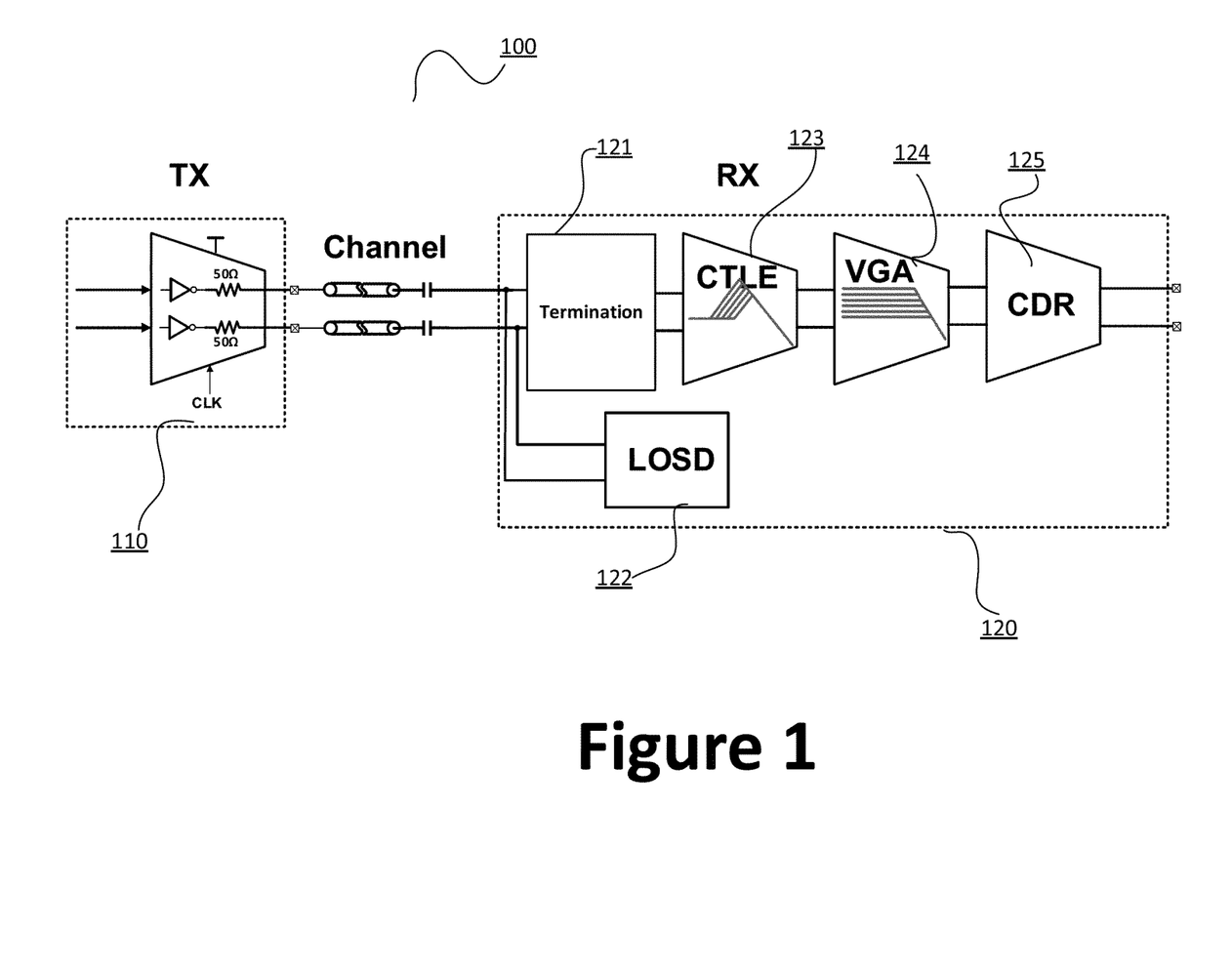
FIG. 1 is a simplified diagram illustrating a communication system according to embodiments of the present invention.

As mentioned above, input termination circuits are an important aspect of receiver implementation. FIG. 1 is a simplified diagram illustrating a communication system according to embodiments of the present invention. This diagram is merely an example, which should not unduly limit the scope of the claims. One of ordinary skill in the art would recognize many variations, alternatives, and modifications. For example, input termination block 121 is implemented as a part of the receiver section 120. In certain embodiments, receiver section 120 as shown is referred to as an analog front end (AFE) section of a receiver. For example, the receiver can be a serializer-deserializer (SerDes) receiver.

Transmitting entity 110 sends data signal, in analog form, to receiver section 120 via communication channels as shown. The incoming signal (from the perspective of receiver section 120) is first processed by the input termination block 121 and the loss-of-signal-detection (LOSD) block 122. Input termination block 121 keeps the input impedance of the receiver close to a predetermined value (e.g., about 50Ω in certain implementations) across a target frequency range (e.g., frequency range used in data transmission) to minimize the reflections. Additionally, input termination block 121 provides signal attenuation to handle a wide range of channels. For example, if the channel is clean and short (e.g., small signal attenuation attributed to channel loss), signal amplitude at the input termination block 121 could be undesirably high and compromise linearity of receiver section 120. By providing attenuation when needed, input termination block 121 helps maintain linearity of receiver section 120.

It is to be noted that the exemplary receiver section 120 also includes a continuous time linear equalizer (CTLE) block 123, a variable-gain amplifier (VGA) block 124, and a clock-data recover (CDR) block 125. It is to be understood that receiver section 120 can be implemented in other ways as well, such as having different functional blocks with other arrangements.

Figure 2:
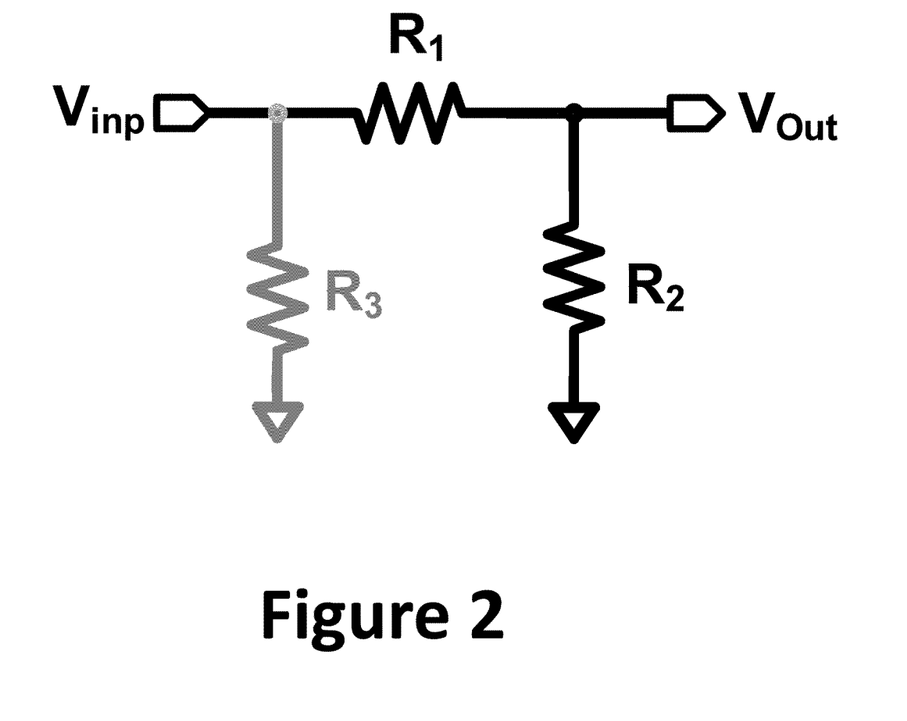
FIG. 2 is a simplified diagram illustrating a conventional input termination circuit.

Conventional input termination blocks are often implemented as an arrangement of resistors as shown in FIG. 2. FIG. 2 is a simplified diagram illustrating a conventional input termination circuit. Input signal is received at $V_{imp}$ and adjusted by resistors $R_1$, $R_2$, and $R_3$. Output is provided at terminal $V_{out}$. As an example, output terminal $V_{out}$ is connected to a CTLE block. By adjusting $R_2$ value while keeping the $R_1$ value unchanged, the input termination circuit attenuates the signal as it appears at $V_{imp}$. But requirement of an attenuator is not only to attenuate the signal, but also to keep the impedance (looking from input) stable and close to a predetermined value (e.g., 50 ohm). And this input impedance needs to be reasonably constant across the frequency range of interest. To keep input impedance constant, resistor $R_3$ is provided. More specifically, the input termination circuit in FIG. 2 adjusts both resistor $R_3$ and resistor $R_2$ to keep the input impedance constant and independent of attenuation adjustment. For example, if impedance of resistor $R_2$ is increased for purpose of increasing the level of attenuation, the impedance of resistor $R_3$ needs to be decreased to keep the input impedance constant. In short, resistors $R_2$ and $R_3$ are to be to adjusted in opposite direction.

Between resistor $R_1$ and the input terminal $V_{imp}$, an input inductor may be provided to improve the bandwidth from input side. Between resistor $R_1$ and the output terminal $V_{out}$, an output inductor may be provided to improve the bandwidth from the output side.

For example, the input impedance (looking from terminal $V_{imp}$) is $$\frac{(2R_1 + R_2)R_3}{2R_1 + R_2 + R_3}.$$

To keep input impedance constant while adjusting attenuation, the impedance of resistor $R_3$ varies in opposite direction relative to the impedance of resistor $R_2$.

The impedance looking into the attenuator from output side (e.g., e.g., looking from terminal $V_{out}$) is $$\frac{(2R_1 + R_3)R_2}{2R_1 + R_2 + R_3},$$

which greatly varies relative to attenuator setting, since impedance values of resistors $R_1$ and $R_3$ are adjusted in opposite directions. As a result, impedance at the output side would experience variable impedance while varying the attenuation. It is understood that varying the output impedance is generally undesirable, as it causes undesirable variable peaking in the attenuator frequency response.

Figure 3:
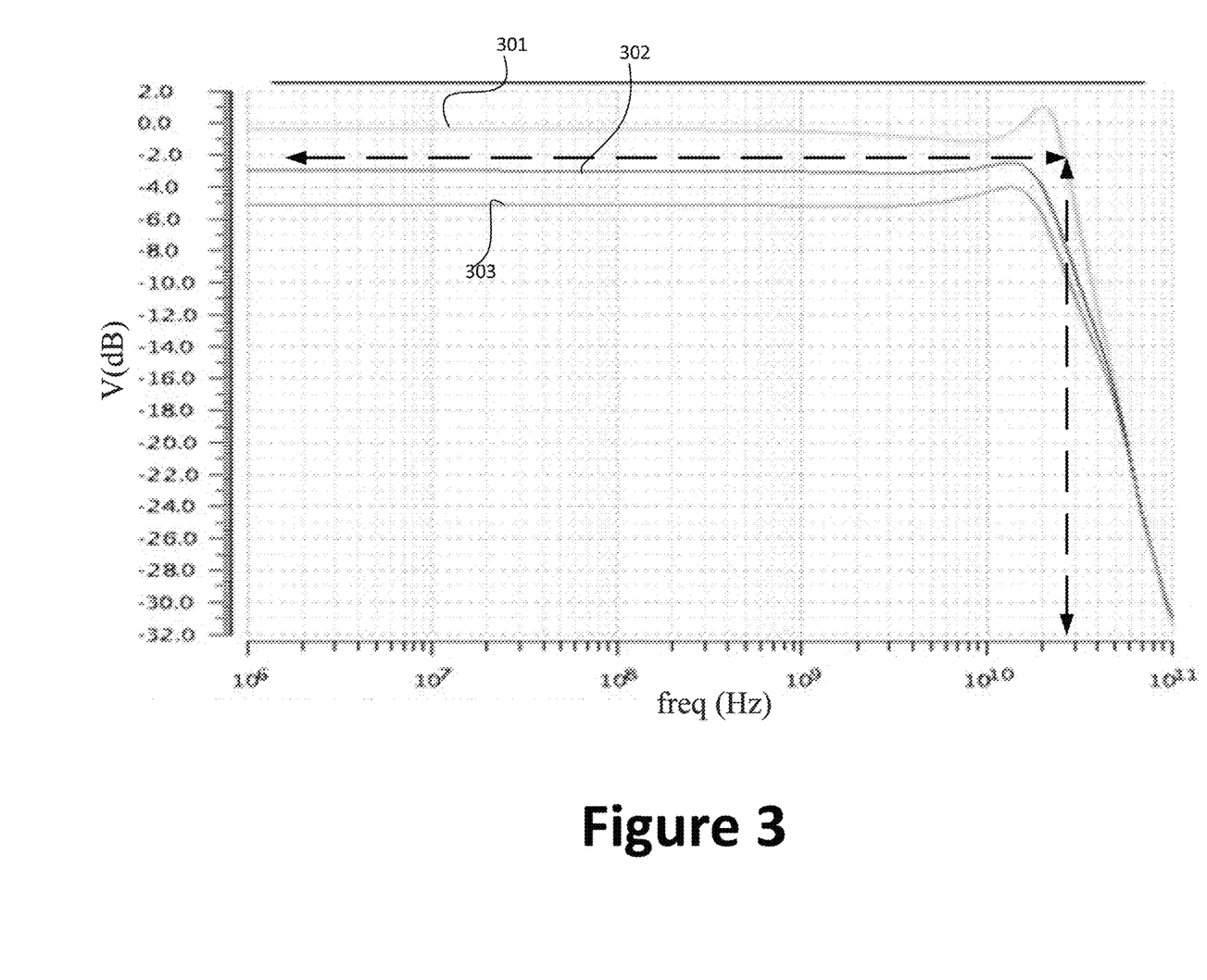
FIG. 3 is a simulation result illustrating frequency response of a conventional input termination circuit.

FIG. 3 is a simulation result illustrating frequency response of a conventional input termination circuit. More specifically, FIG. 3 shows the frequency response of the attenuator while varying attenuation of resistor $R_2$. For example, resistor $R_2$ can be adjusted by a digitally programmable control signal. FIG. 3 shows that for a low attenuation setting (i.e., curve 301), there is almost a 2 dB peaking in the response, and the bandwidth at 0 dB attenuation setting is about 27 GHz. In comparison, at a high attenuation setting (curve 303), there is a 0.5 dB peaking. Undesirably, there are different peaking amount at different attenuation settings.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 4:
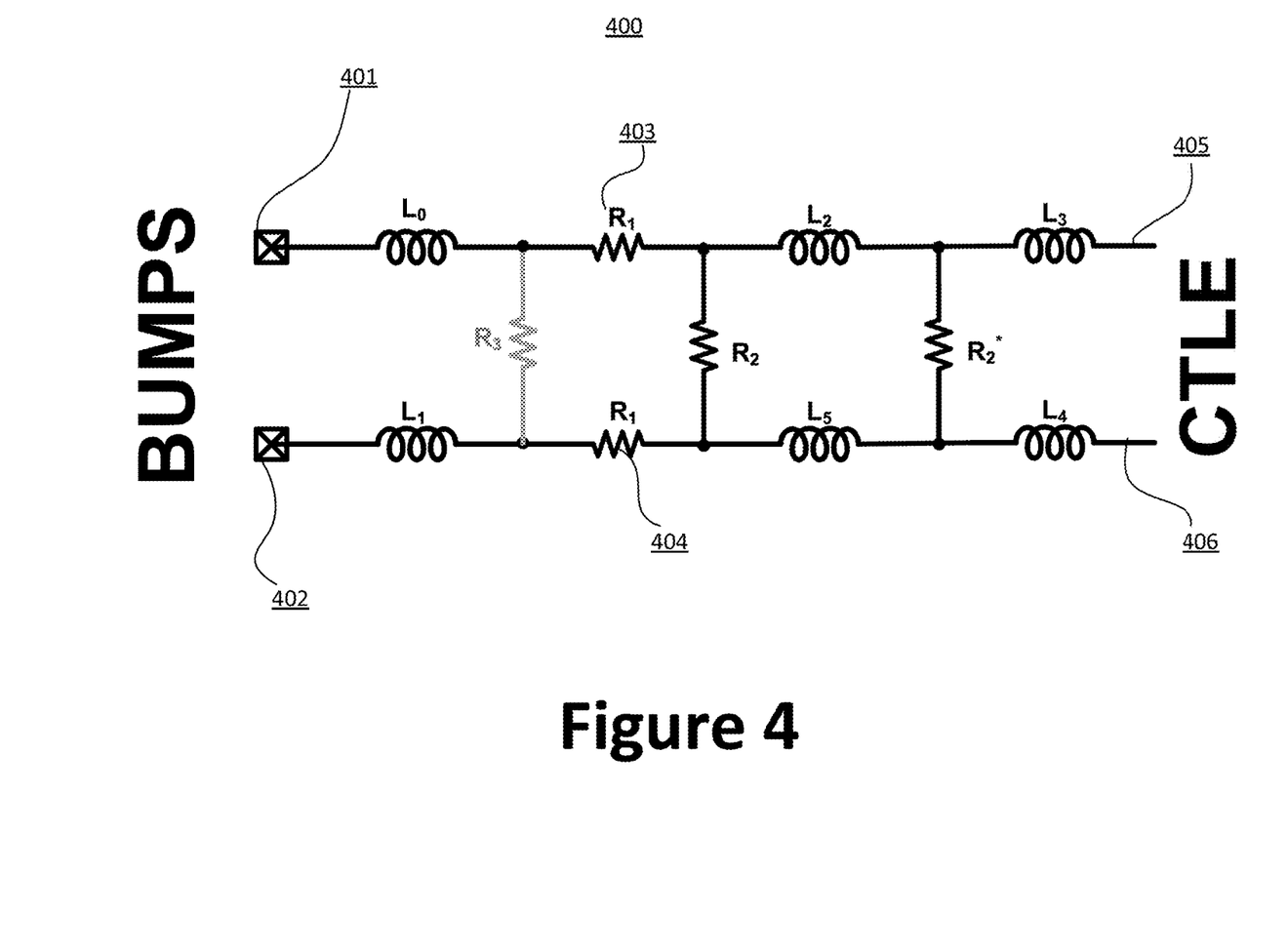
FIG. 4 is a simplified diagram illustrating an input terminal block 400 according to embodiments of the present invention.

FIG. 4 is a simplified diagram illustrating an input terminal block 400 according to embodiments of the present invention. This diagram is merely an example, which should not unduly limit the scope of the claims. One of ordinary skill in the art would recognize many variations, alternatives, and modifications. Data signals are received in pairs. For example, input terminal 401 receives positive input signal $V_{imp}$, and input terminal 402 receives negative input signal $V_{inn}$. Output terminal 405 provides positive output signal $V_{outp}$ and output terminal 406 provides negative output signal $V_{outn}$. Inductors $L_0$ and $L_1$ are provided to improve input bandwidth. Inductors $L_3$ and $L_4$ are provided to improve output bandwidth. It is to be appreciated that input terminal block 400 removes the undesirable peaking existed in conventional input terminal circuits. Resistors $R_2$ and $R_2^*$ are implemented (in place of resistor $R_2$ in conventional design) to allow for attenuation adjustment. For example, resistors $R_2$ and $R_2^*$ are implemented using variable resistors that are responsive to control signals. It is to be appreciated by using two resistors instead of the one, the input terminal block 400 has an additional degree of freedom for adjustment. Peaking can be adjusted by changing the ratio of resistors $R_2$ and $R_2^*$, maintaining the output impedance (e.g., looking from CTLE side) constant. More specifically, impedance values of the $R_2$ and $R_2^*$ are adjusted in opposite directions at various operating frequencies. More specifically, to increase the amount of attenuation at input termination block 400, the impedance value of resistor $R_2$ is decreased and the impedance value of resistor $R_2^*$ is increased. For example, the output impedance value can be expressed as $(R_2+sL_2)/R_2^*$, which is close to a constant value due to the fact that resistors $R_2$ and $R_2^*$ are adjusted in opposite directions. The impedance attribute to inductor $L_2$ is frequency dependent. With an increased frequency, inductor $L_2$ can also shield the impact of resistor $R_2$. For example, the inductance value of inductor $L_2$ is chosen in such a way that the time constant of section $(L_2/R_2)$ is higher than time constant of section $(L_2/R_2^*)$.

Figure 5:
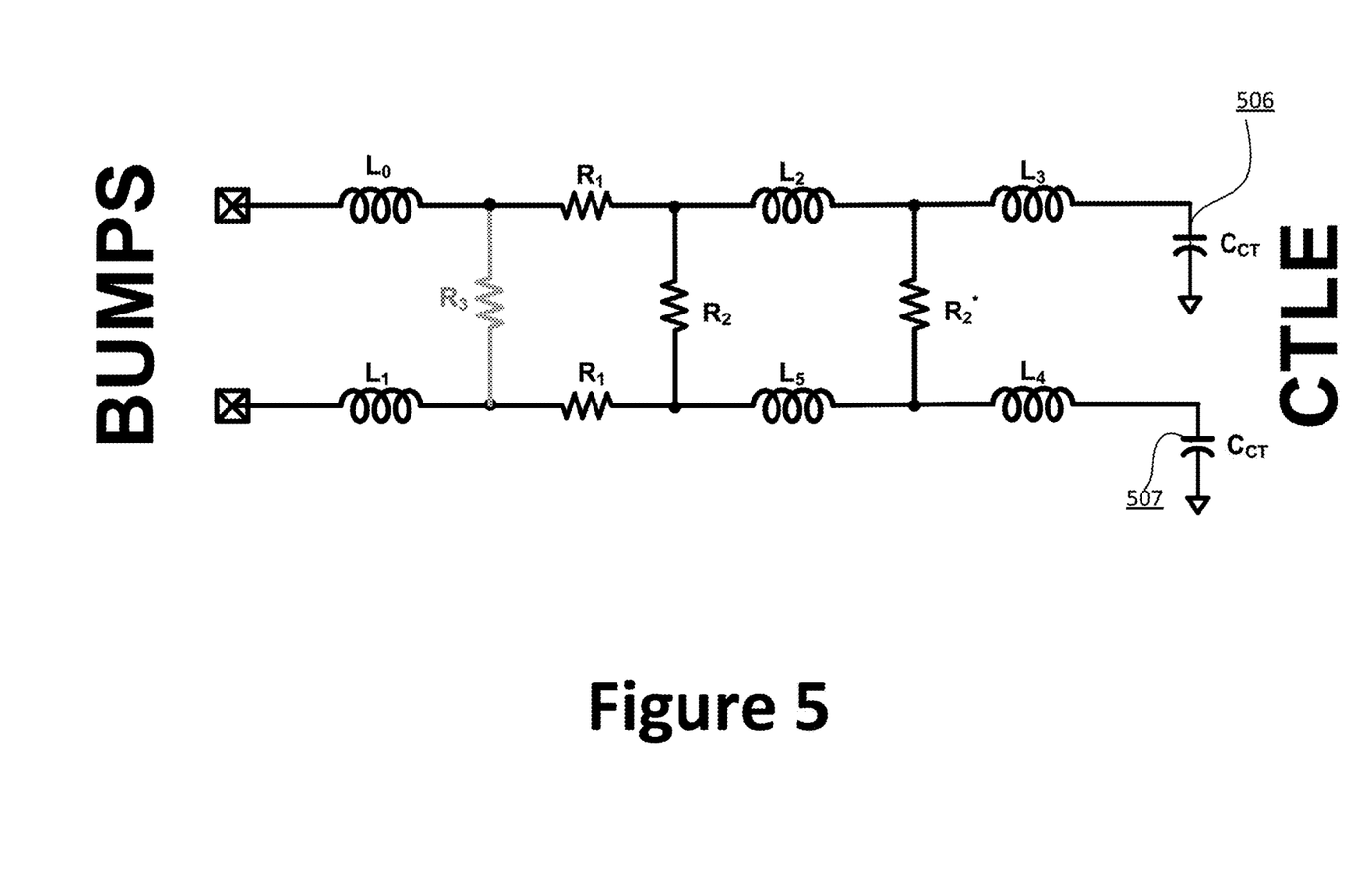
FIG. 5 is a simplified diagram illustrating an input termination block and its outputs according to embodiments of the present invention.

FIG. 5 is a simplified diagram illustrating an input termination block and its outputs according to embodiments of the present invention. This diagram is merely an example, which should not unduly limit the scope of the claims. One of ordinary skill in the art would recognize many variations, alternatives, and modifications. The output terminals of the input terminal block are coupled to a circuit or module that has its own input capacitance. For example, a CTLE block is connected to the output terminals of the input termination block. It is to be appreciated that other circuits or modules may be coupled to the output terminals instead of the CTLE block. The input capacitance of the CTLE is modeled using capacitors $C_{CT}$ as shown. Typically, input capacitance is parasitic of the wiring and it is highly undesirable. In various embodiments, inductors $L_3$ and $L_4$ are adjustable and configured to tune out the input capacitance $C_{CT}$.

Depending on the implementation, the resistance values can be adjusted for specific attenuation settings. For example, for 6 dB attenuation setting, resistors values are set as the following: $R_1=25\Omega$, $R_2=35\Omega$, and $R_2^*=87.5\Omega$.

Figure 6:
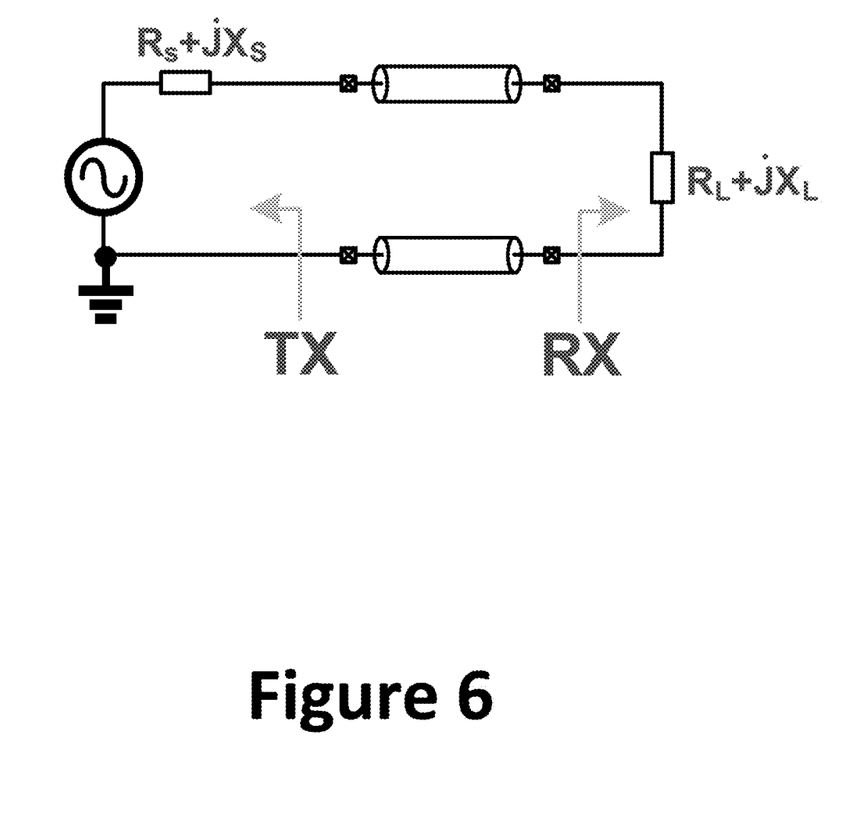
FIG. 6 is a simplified diagram illustrating impedance modeling in a communication system according to embodiments of the present invention.

FIG. 6 is a simplified diagram illustrating impedance modeling in a communication system according to embodiments of the present invention. This diagram is merely an example, which should not unduly limit the scope of the claims. One of ordinary skill in the art would recognize many variations, alternatives, and modifications. For example, both transmitter (TX) side and receiver side (RX) are modeling as combination of resistive and reactive elements. For a given TX output impedance (including package and output driver) Rs+jXs, the RX termination matches the conjugate of TX impedance, which is to receive from TX maximum power and minimum (ideally zero) reflections. For example, for a conjugate matched TX impedance ($Z_{TX}$) and RX impedance ($Z_{RX}$), $Z_{RX}=Z_{TX}*$, and that mean $R_s=R_L$ and $X_s=-X_L$. For example, if a CTLE is connected to the output terminal of the input termination circuit, a capacitive input impedance is introduced (attributing to CTLE). In FIG. 5, inductor $L_3$ provides conjugate matching for the CTLE input impedance.

Figure 7:
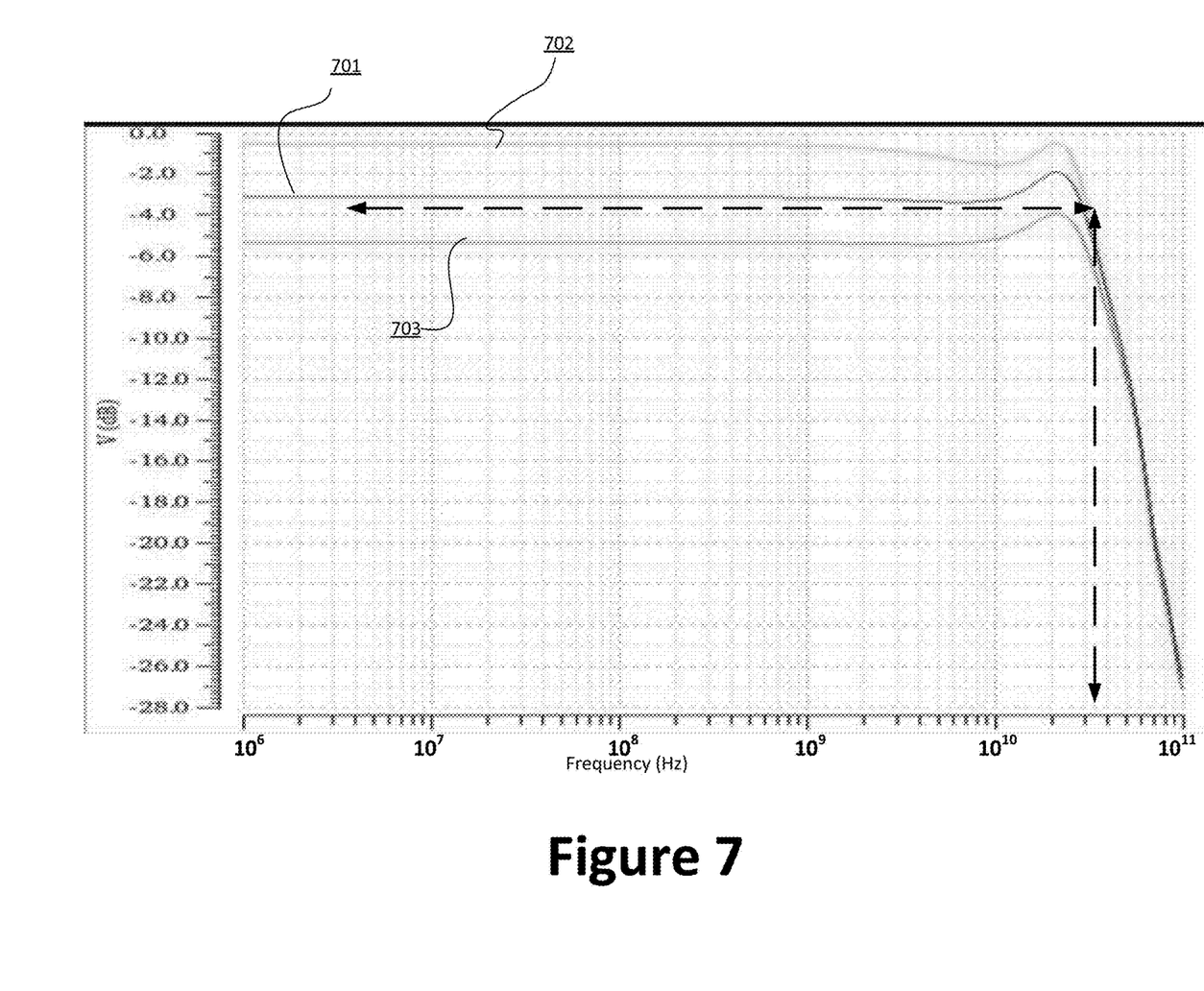
FIG. 7 is a graph illustrating frequency response of an input termination circuit according to embodiments of the present invention.

FIG. 7 is a graph illustrating frequency response of an input termination circuit according to embodiments of the present invention. This diagram is merely an example, which should not unduly limit the scope of the claims. One of ordinary skill in the art would recognize many variations, alternatives, and modifications. More specifically, FIG. 7 shows the frequency response of the attenuator while varying values of resistor $R_2$ and resistor $R2*$. The three attenuation settings respectively correspond to curves 701, 702, and 703. For 0 DB attenuation (curve 702), the bandwidth is about 31.2 GHz. The shapes and bandwidths of the three curves 701, 702, and 703 are remarkably similar, as they are close to straight vertical shifts at different attenuation sittings. The peaking associated these curves is about 1.5 dB, and there is a high level of linearity associated with different attenuation settings.

Figure 8:
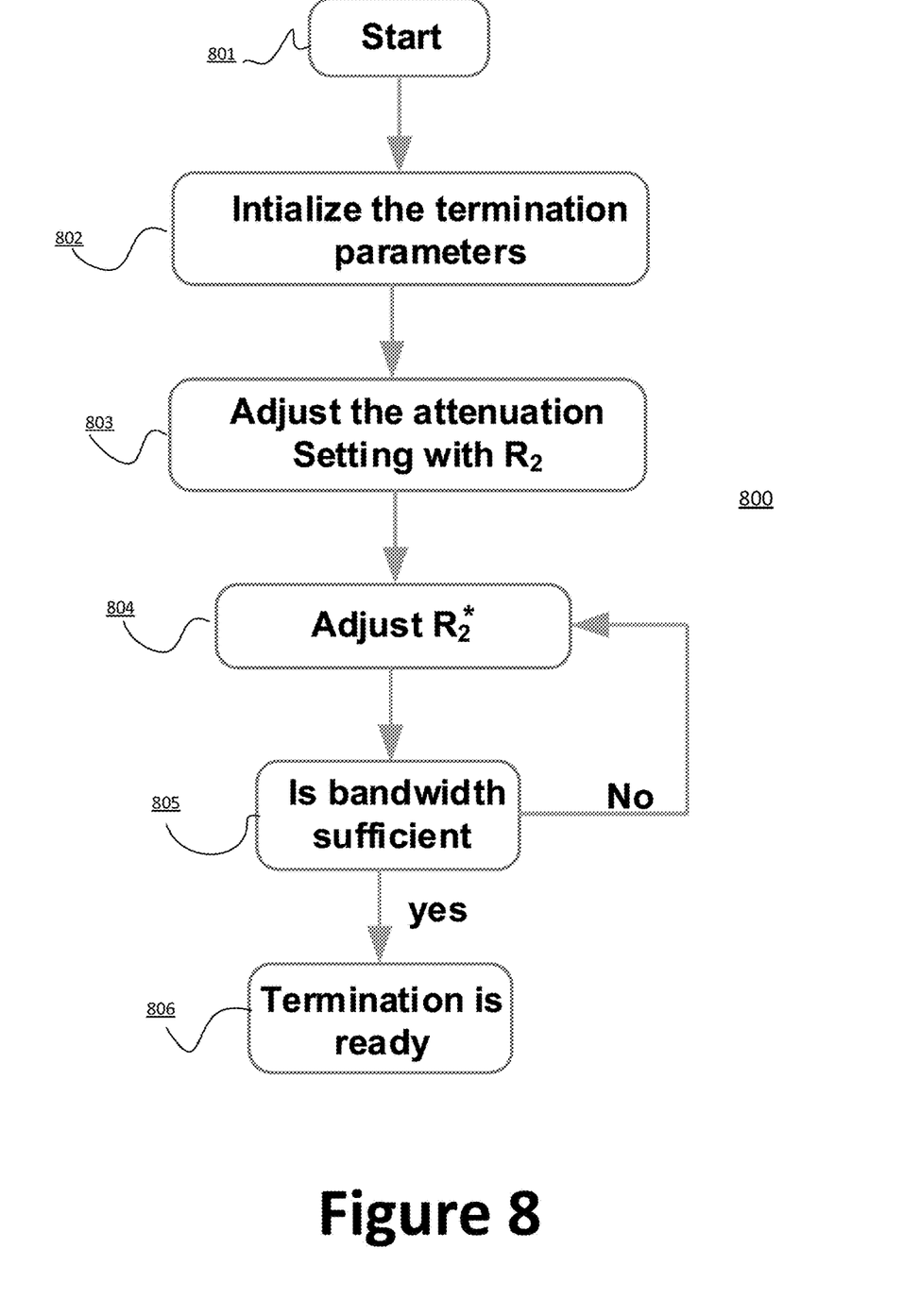
FIG. 8 is a simplified flow diagram illustrating a process for determining adjusting attenuation value according to embodiments of the present invention.

FIG. 8 is a simplified flow diagram illustrating a process for determining adjusting attenuation value according to embodiments of the present invention. This diagram is merely an example, which should not unduly limit the scope of the claims. One of ordinary skill in the art would recognize many variations, alternatives, and modifications. For example, one or more steps may be added, removed, replaced, modified, replaced, repeated, and/or overlapped, and should not limit the scope of claims. For example, process 800 is implemented using the input termination block illustrated in FIG. 4. For example, resistors and inductors illustrated in FIG. 4 are adjustable. A control module (not shown in FIG. 4) provides control signals to adjust resistors and the inductors, and the control module additionally includes control logic to implement process 800. Process 800 starts at block 801. At block 802, various termination parameters are initialized. For example, adjustable resistors and inductors are initialized with a set of default initialization values.

Input signal Attenuation is adjusted through resistor $R_2$, at block 803. For example, attenuation setting is determined by a feedback loop, and the amount of attenuation is based on the signal strength of the incoming data signal. Resistance value of resistor $R_2*$ is adjusted at block 804. As explained above, resistance of resistor $R_2*$ is adjusted in an opposite direction relative to resistance of resistor $R_2$. It is to be appreciated that by adjusting the value of resistor $R_2*$, output impedance and bandwidth can be maintained at a desired level. For example, a control module determines whether the bandwidth is sufficient. If not, the control module adjusts the value of the resistor $R_2*$ according until the desired bandwidth is obtained. In various embodiments, other elements may be adjusted as well, such as various inductors. Once a desired bandwidth is achieved, it is determined that the input terminal block is ready, at block 806. For example, the control module generates a ready signal at block 806.

FIG. 9 is a simplified diagram illustrating effect of output inductor according to embodiments of the present invention. This diagram is merely an example, which should not unduly limit the scope of the claims. One of ordinary skill in the art would recognize many variations, alternatives, and modifications. For example, the effect illustrated in FIG. 9 is associated with input termination block 400, and the output inductor refers to inductor $L_2$. Plot 901 shows the impedance for the minimum setting. Plot 903 shows impedance at different (increased) attenuation levels. Due to inductor shielding effect, impedance rises; because of input capacitance, the impedance becomes flat. In various implementations, the output inductor is configured to minimize peaking for the effective impedance. It is to be appreciated that implementations according to embodiments of the present invention can provide wide and stable bandwidth at different attenuation setting compared to conventional terminational circuits.

It is to be appreciated that embodiments of the present invention provide many advantages and benefits. As illustrated in the graphs (see FIG. 7 and FIG. 9), input termination circuits according to the present invention constant peaking and constant bandwidth across different attenuation settings; in the conventional circuit, peaking changes with attenuation settings, resulting undesired bandwidth narrowing. It is to be noted that such improvements in bandwidth and performance are achieved in comparable power budget. For example, the input termination circuits according to the present invention can be used in high speed SerDes receives with a high level of linearity. In SerDes receivers, the improved bandwidth improves the signal-to-noise ratio (SNR) of the serial communication link. The improved SNR in turn translates to improved sensitivity and better bit error rate (BER).

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An input termination circuit comprising:
   an input terminal configured to receive analog signal;
   a first inductor connected to the input terminal, the first inductor being associated with an input bandwidth;
   a first input resistor connected to the first inductor;
   a second input resistor connected to the first input resistor and the first inductor, the second input resistor being adjustable by a first control signal;
   a second inductor connected to the first input resistor;
   a first attenuation resistor connected to the first input resistor and the second inductor, the first attenuation resistor being adjustable by a second control signal;
   an output inductor connected to the second inductor, the output inductor being associated with an output bandwidth;
   a second attenuation resistor connected to the second inductor and the output inductor, the second attenuation resistor being adjustable by a third control signal; and
   an output terminal connected to the output inductor;
   wherein the first attenuation resistor and the second attenuation resistor are adjustable in opposite directions to modify an attenuation amount associated with the input termination circuit.

2. The circuit of claim 1 further comprising a control module for generating the first control signal and the second control signal.

3. The circuit of claim 1 wherein first attenuation resistor and the second attenuation resistor are associated with an output impedance.

4. The circuit of claim 3 wherein the output impedance is maintained at a substantially constant resistance value by adjusting the first attenuation resistor and the second attenuation resistor in the opposite directions.

5. The circuit of claim 1 wherein a ratio between the first attenuation resistor and the second attenuation resistor is associated with a peaking frequency.

6. The circuit of claim 1 wherein the attenuation amount is increased by decreasing a resistance value associated with the first attenuation resistor.

7. The circuit of claim 6 wherein a resistance value of the second attenuation resistor is increased.

8. The circuit of claim 1 wherein:
   a first time constant is associated with the second inductor and the first attenuation resistor;
   a second time constant is associated with the second inductor and the second attenuation resistor;
   the first time constant is higher than the second time constant.

9. The circuit of claim 1 wherein the output inductor is selected to provide conjugate matching relative to an output impedance coupled to the output terminal.

10. The circuit of claim 9 wherein a continuous time linear equalizer (CTLE) is coupled to the output terminal.

11. The circuit of claim 10 wherein the CTLE is characterized by a capacitive input impedance.

* * * * *